United States Patent
Aratake

[11] Patent Number: 5,159,702
[45] Date of Patent: Oct. 27, 1992

[54] MULTICHANNEL ACCESS RADIO DATA COMMUNICATION SYSTEM WHICH HOLDS A CHANNEL TO REDUCE BURDEN OF REALLOCATION

[75] Inventor: Kenzi Aratake, Kawasaki, Japan

[73] Assignee: Fujitsu Limited, Kawasaki, Japan

[21] Appl. No.: 369,078

[22] Filed: Jun. 20, 1989

[30] Foreign Application Priority Data

Jun. 21, 1988 [JP]  Japan ................. 63-151260

[51] Int. Cl.⁵ ............ H04B 7/00; H04M 11/00
[52] U.S. Cl. .................. 455/33.1; 455/54.2; 455/56.1; 455/70; 379/63
[58] Field of Search ............ 455/17, 34, 33, 54, 455/56, 70, 88, 181, 231, 33.1, 54.2, 56.1, 181.1, 34.1; 370/95.1; 379/58-63

[56] References Cited

U.S. PATENT DOCUMENTS

| | | | |
|---|---|---|---|
| 4,012,597 | 3/1977 | Lynk, Jr. et al. | 455/54 |
| 4,679,225 | 7/1987 | Higashiyama | 455/32 |
| 4,712,229 | 12/1987 | Nakamura | 455/56 |
| 4,882,766 | 11/1989 | Akaiwa | 455/56 |

OTHER PUBLICATIONS

Pamphlet "How to use the MCA system" published by Movable Radio Center, on Jul. 1986.

*Primary Examiner*—Reinhard J. Eisenzopf
*Assistant Examiner*—Andrew Faile
*Attorney, Agent, or Firm*—Staas & Halsey

[57] ABSTRACT

An MCA radio data communication system linking a base station and a plurality of terminal stations by radio channels through a control station, wherein note is taken of the facts that one radio channel can be occupied for only a certain occupied time T and that even after the completion of one data communication the radio channel is held for within a certain holding time t (T>t). The present invention allows each of a plurality of terminal stations to share the same radio channels without a channel assignment operation. A communication end signal is simultaneously broadcast upon completion of a first data communication and so that another terminal station demanding a second data communication starts its data communication promptly upon receiving the communication end signal without a channel assignment operation.

14 Claims, 9 Drawing Sheets

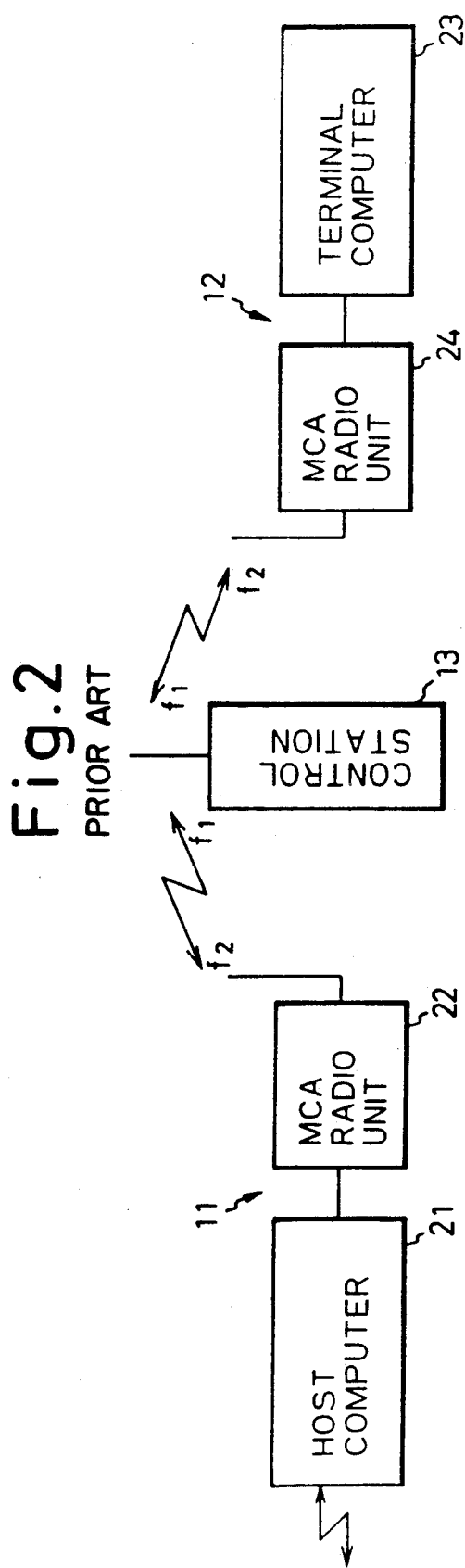

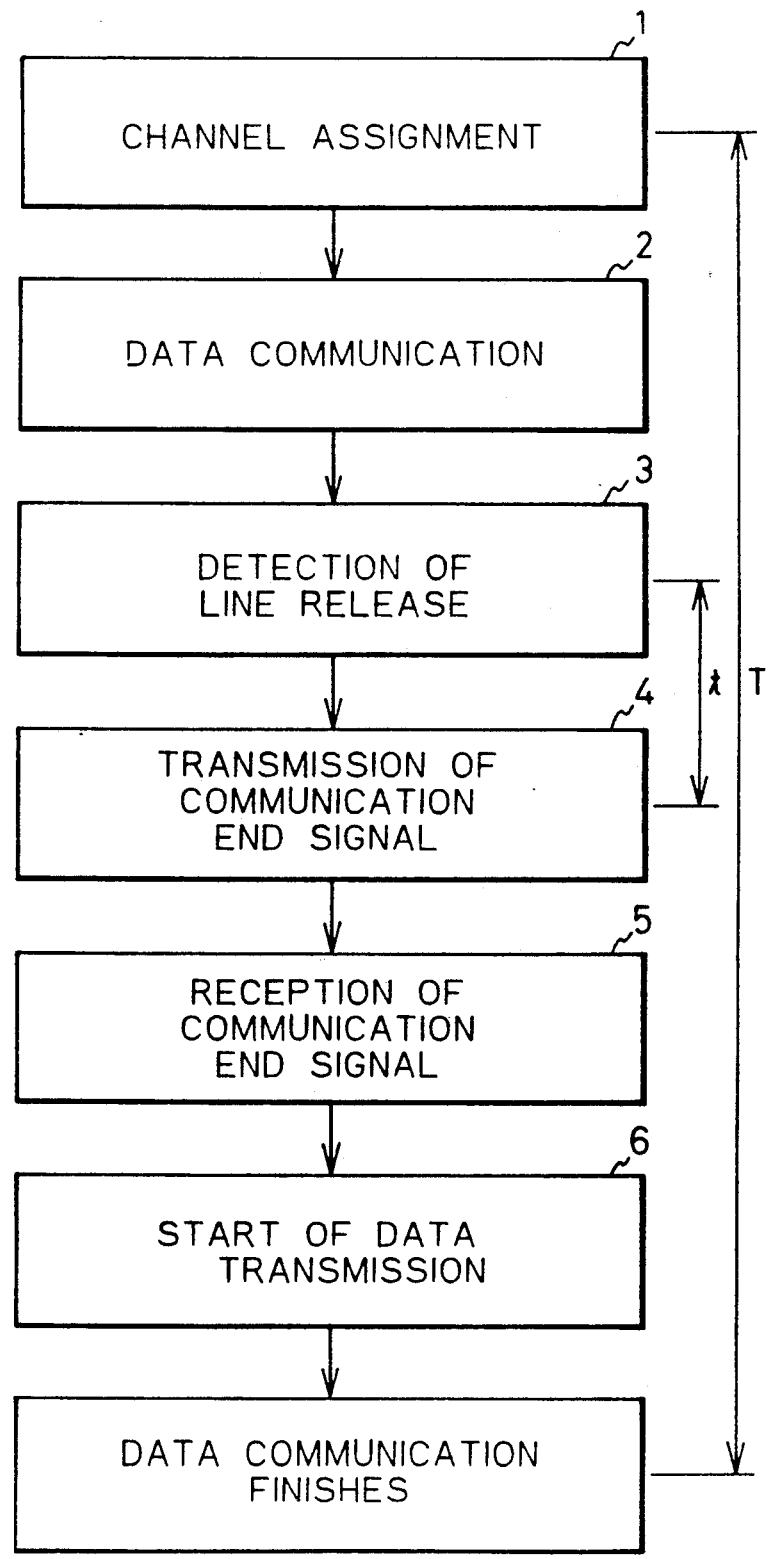

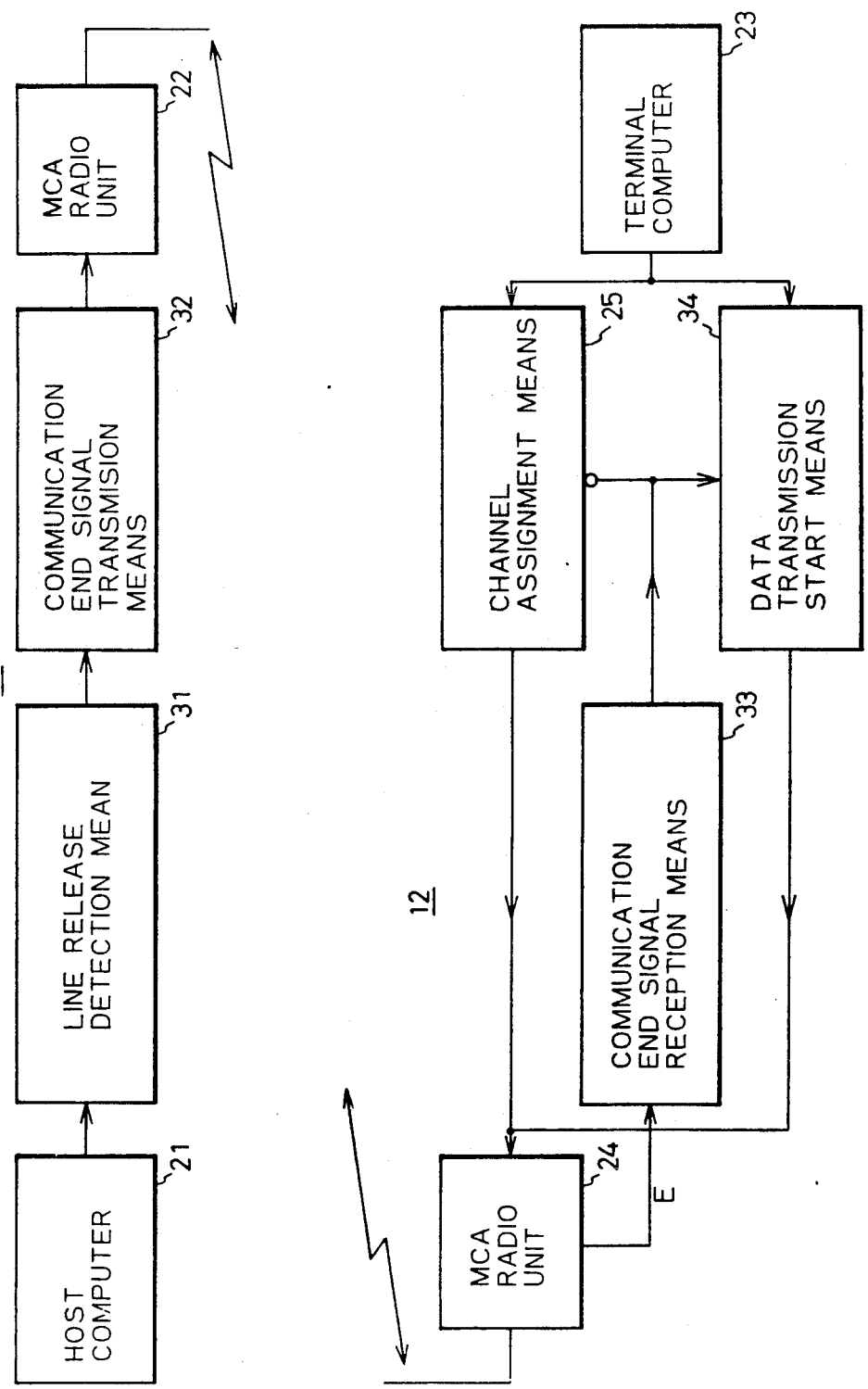

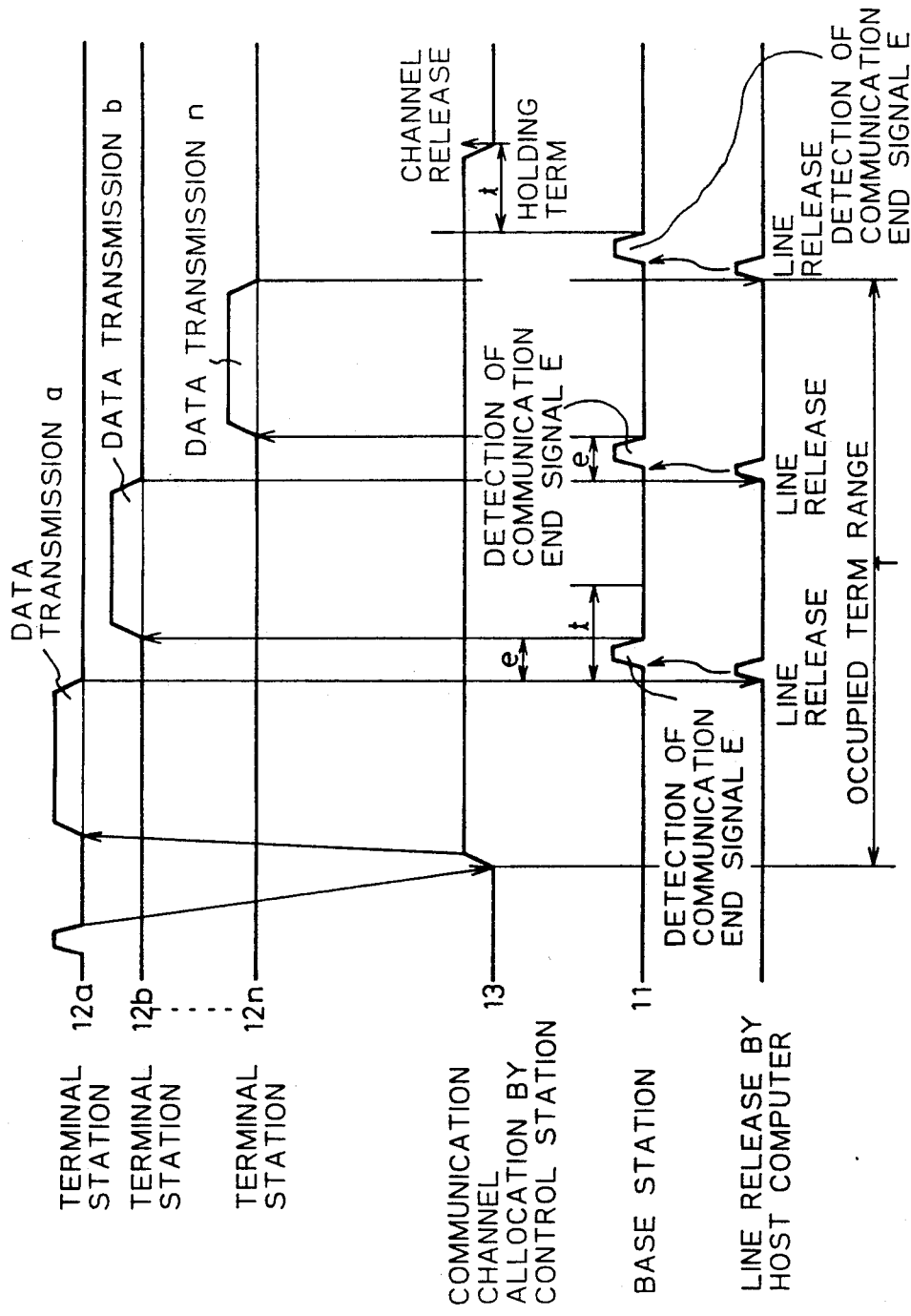

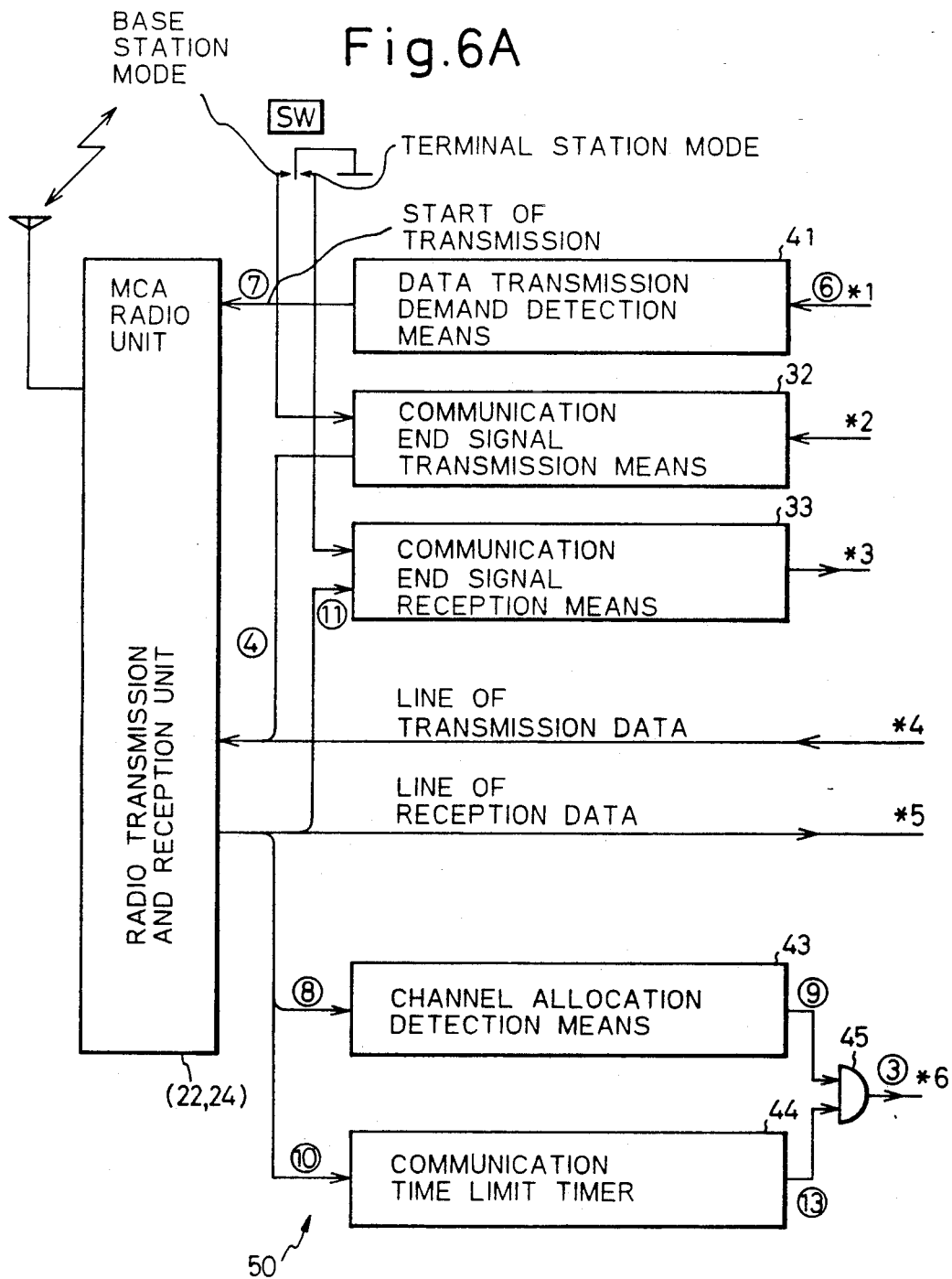

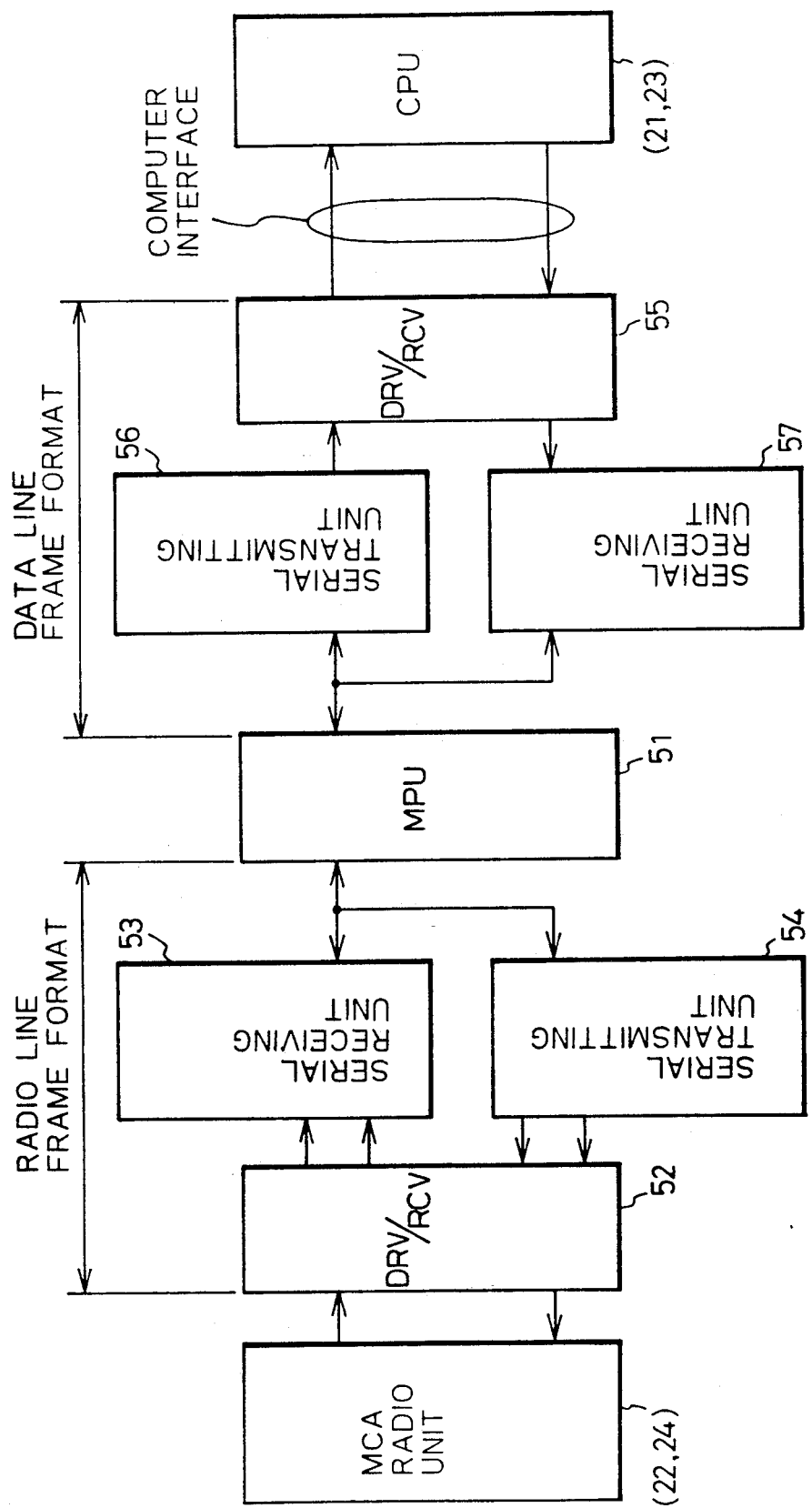

MULTICHANNEL ACCESS RADIO DATA COMMUNICATION SYSTEM WHICH HOLDS A CHANNEL TO REDUCE BURDEN OF REALLOCATION

BACKGROUND OF THE INVENTION

1. Field of the Invention

The present invention relates to a multichannel access radio data communication system, more particularly to a multichannel access (MCA) radio data communication system wherein the users are station for performing radio data communication among users, a user at a terminal station receiving allocation of one of a plurality of predetermined channels to secure a channel assignment. Radio data communication on a channel is performed over a fixed occupied time T the channel being released after the elapse of a fixed holding time t (T>t) after the completion of the radio data communication.

Radio systems for business use, for example, utilizing the MCA radio method are widely available. In such systems, both voice and data communication are possible, but the present invention refers in particular to radio data communication.

2. Description of the Related Art

As will be explained in more detail, a common MCA radio data communication system comprises a base station e.g., a central command office), a plurality of terminal stations (e.g.), movable terminal equipment, for engaging in radio data communication with the base station, and a control station (for providing radio communication channels between the base stations) and terminal stations. Further, the base station has a host computer, while the terminal stations have terminal computers.

When a first terminal station requests a communication, the control station assigns an idle channel from among a plurality of channels to the first terminal station for communication. When the first terminal station receives and secures the channel assignment communication with the base station can begin. When the first terminal station completes the communication, a line release operation is performed between the host computer and the first terminal computer, thereby releasing the channel in the MCA radio channel network as well.

When a second terminal station among a group of users at the same location as the above first terminal station wishes to start data communication immediately after the first terminal station completes communication, the second terminal station must go through the procedure for channel assignment all over again.

In the morning and evening when data traffic density is high wait time for channel assignment can be as much as several minutes to several tens of minutes, which does not allow quick data processing.

If, in one channel allocation, (assignment) a maximum 60 seconds of occupied time T is allowed and the data communication is completed in a short time (for example, 20 seconds), then the communication time given cannot be used to its maximum limit. In this example, there is the problem of the remaining 40 seconds being wastefully discarded. This causes call loss in a user.

SUMMARY OF THE INVENTION

An important object of the invention is to provide an MCA radio data communication system with litter call loss due to channel assignment and allocation and thus efficient utilization of the channel.

To achieve the above object, in present invention the base station, immediately with a holding time T sends out a communication end signal when data communication with a first terminal station is complete and the host computer of the base station detects a release of the line. "Immediately" here means within the holding time t as mentioned above. If a second terminal demands to start data communication during the holding time T, then the second terminal station can start talking with the base station, promptly within the holding time T, before catching the communication end signal. Here, "promptly" means within the holding time t. If within the holding time t, the afore-mentioned control station reserves the held channel allocated to the first terminal station which previously had been engaged in data communication, the second terminal station can make use of the held channel without having to obtain a new channel assignment. The necessity of performing a channel assignment for the second terminal station is thus eliminated.

Therefore, if within the maximum permissible occupied time T, a plurality of terminal stations in the same user group, such as a group containing the above-mentioned first and second terminal stations, can successively engage in data communication without having to obtain a new channel assignment.

BRIEF DESCRIPTION OF THE DRAWINGS

The above object and features of the present invention will be more apparent from the following description of the preferred embodiments with reference to the accompanying drawings, wherein:

FIG. 2 is a view showing in detail the MCA radio communication system of the prior art;

FIG. 3 is a flow chart for explaining the operation of the present invention;

FIG. 4 is a view showing the principle of construction of the system of the present invention;

FIG. 5 is a time chart showing an example of the operation based on the present invention;

FIGS. 6A and 6B are black diagrams showing the constitution of the system of the present invention;

FIG. 7 is a block diagram showing an example of the constitution of the system in the case of use of a microprocessor.

DESCRIPTION OF THE PREFERRED EMBODIMENTS

Before describing the embodiments of the present invention, the related art and the disadvantages therein will be described with reference to the related figures.

Figure 1:
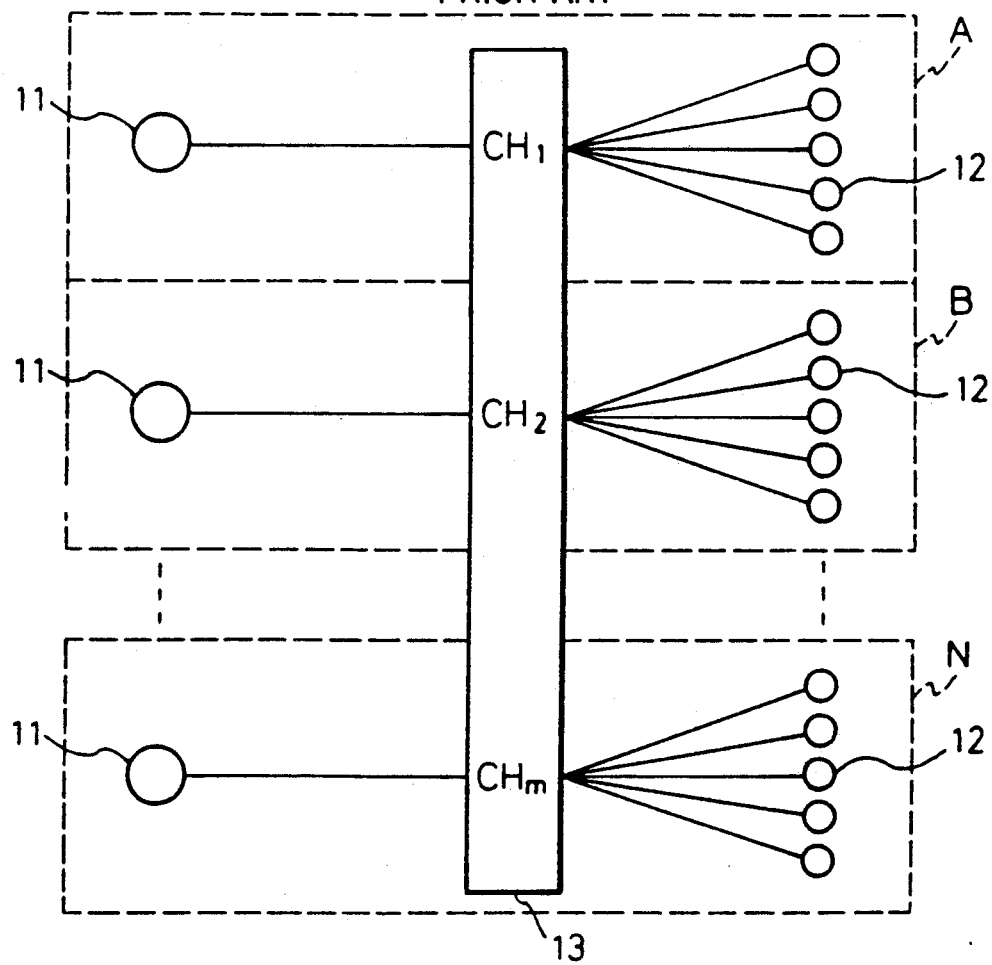
FIG. 1 is a view showing the outline of a general MCA radio communication system of the prior art.

FIG. 1 is a view showing the outline of a general MCA radio communication system. In the figure, 11 is a base station serving as the center and 12 is one of a plurality of terminal stations for performing radio data communication with the same. A user is formed by a pair of such a base station 11 and terminal station 12. In the figure, an example is shown of common use of a single MCA radio communication system by users A, B ... N. In this case, the number of channels (CH) which can be used is limited. The figure shows the example of m channels: CH1, CH2 ... CHm. This is for promoting efficient utilization of frequencies. Therefore, a radio station for performing the work for channel allocation is necessary. In the figure, the control station 13 does that work. Note that for the channel allocation, use is made of a control channel separate from CH1 to CHm. After the channel allocation is received, channel assignment is performed by the terminal station sending out the demand for data transmission and the corresponding base station and the data communication is commenced. For example, 5000 terminal stations will for instance share 15 channels, so a fixed occupied term is set for the time allowed for data communication. T is for example 60 seconds, with a channel only being able to be occupied for a maximum 60 seconds in a single channel assignment. Further, even in the occupied time T, if a single data communication is completed, the line is forcibly released after a fixed holding term t elapses and the channel is then supplied to another terminal station. Alternatively, the channel is supplied to a terminal station in another user group.

FIG. 2 is a view showing in detail the MCA radio communication system. The base station 11 serving as the center and an arbitrary terminal station 12 linked with that base station 11 receive a channel allocation through the control station 13. Note that if the upstream side frequency based around the control station 13 is $f_1$, the downstream side frequency is $f_2$ ($f_2 \neq f_1$).

If the base station 11 is a main office (command office), for example, a host computer 21 and MCA radio unit 22 are installed there. The terminal station 12 is, for example, in a moving vehicle, where a handheld type terminal computer 23 and MCA radio unit 24 are installed. In data communication between computers by an ordinary public network, the line is always released after the completion of a single communication. Therefore, if such general intercomputer data communication is applied to an MCA radio data communication system, the terminal stations would have to perform a channel assignment operation before the next data communication each time a communication ends.

When a terminal station completes a communication as mentioned above, the computers (21, 23) perform a line release operation. Therefore, the channel is released in the MCA radio channel link as well. In the start of a later data communication, the channel assignment must be performed all over again. However, in the time periods in the morning and evening when data traffic density is high, the waiting time until receipt of a channel allocation can be from several minutes to several tens of minutes, for example, which does not allow speedy data processing.

If, in one channel allocation, a maximum 60 seconds of occupied time T is allowed and the data communication is completed in a short time (for example, 20 seconds), then the communication time given cannot be used to its maximum limit. In this example, there is the problem of the remaining 40 seconds being wastefully discarded.

Therefore, the present invention provides an MCA radio data communication system which enables suppression of the call loss in a single channel allocation and thus efficient utilization of the channel through:

the provision in the base station of a communication end signal transmission means for sending out a communication end signal E promptly after the completion of a first radio data communication with a terminal station and provision in each of the terminal stations of a transmission end signal reception means to be able to respond to the communication end signal E, so that a second radio data communication can start to be performed with the terminal station when the communication end signal E is detected.

FIG. 3 is a flow chart for explaining the operation of the present invention and includes the following:

Step 1: First terminal station performs channel assignment.

Step 2: Predetermined data communication is performed with the base station.

Step 3: Upon completion of communication, the base station detects the line release by its own computer.

Step 4: The line release is received and a communication end signal E is generated and sent out within the holding term t.

Step 5: A second terminal station in the same user group which demands data transmission receives the communication end signal E.

Step 6: The second terminal station promptly starts up the data communication, thereby without requiring a channel assignment procedure.

FIG. 4 is a view showing the principle of construction of the system of the present invention. In the figure, the host computer 21 and the MCA radio unit 22 in the base station 11 are as already explained. The terminal computer 23 and the MCA radio unit 24 in the terminal station 12 are also as already explained. The channel assignment means 25 is an existing one.

Therefore, the new constitutional elements here are a line release detection means 31 and communication end signal transmission means 32 in the base station 11 and a communication end signal reception means 33 and data transmission start means 34 in the terminal station 12. The data transmission start means 34 or the existing channel assignment means 25 are driven according to the received signal ("1") from the communication end signal reception means 33 or unreceived signal ("0").

In the final analysis, the host computer provided in the base station has a line release detection means which outputs and detects a signal showing the line release upon completion of the radio data communication with a certain terminal station and the communication end signal transmission means being started by the detected output from the line release detection means and transmitting the communication end signal E.

On the other hand, each of the terminal stations has a channel assignment means and data transmission start means, when the communication end signal reception means fails to detect a communication end signal E upon a demand for start of radio data communication, starts the channel assignment means and receives the channel allocation, and conversely, when the communication end signal reception means detects a communication end signal E upon a demand for start of radio data communication, starts the data transmission start means and promptly starts radio data communication with the base station without going through channel assignment.

An important feature of the present invention lies in the transmission of the communication end signal E immediately after the line release. The communication end signal E for the first terminal station travels to the terminal station 12 and also reaches the control station 13. This being so, when the control station 13 detects the carrier of the communication end signal E, it holds off on the release of the channel. The reason for this is that the communication end signal E can be generated within the time T or holding term t. Therefore, a second terminal station with a data transmission demand can promptly be transferred to that channel and start the desired data communication. At this time, a channel assignment operation is prohibited. This is because it is not needed. However, even if the channel is transferred, the occupied time T or occupied term T cannot be exceeded.

In this way, if within the occupied time T, channel occupancy can be taken over successively by a plurality of terminal stations with data transmission demands and thus the probability of call loss can be greatly reduced. In particular, this is effective when there are a plurality of terminal stations with short data communication times. Note that when a conflict arises among a plurality of terminal stations, selection is made giving priority to the one with the highest receiving field intensity, just as in the prior art.

FIG. 5 is a time chart showing an example of the operation based on the present invention. In the time chart shown in the figure, the point of the present invention is that when there is a line release as shown in the bottommost part of the chart, this is detected and a communication end signal E is transmitted, whereby a plurality of data communications may be executed almostly consecutively with only a slight idle term (e in the figure) if within the occupied time T without execution of a channel assignment operation each time.

First, when the terminal station 12a demands data transmission, it performs a call origination. This the channel assignment operation. The control station 13 allocates one of the idle channels. If there are no idle ones, it places the terminal station on standby. Once a channel allocation is received, that channel may be occupied until the elapse of a maximum fixed time T. Therefore, the terminal station 12a begins data transmission a. When this data communication is completed, the host computer 21 of the base station 11 outputs a signal showing the line release. When this is detected, the base station 11 sends out a communication end signal E in a predetermined holding term t. At this time, if there is another terminal station 12b demanding data transmission, the terminal station 12b receives the communication end signal E and promptly begins the desired data communication b, that is, without a channel assignment operation.

The same thing applies to a terminal station 12n if within the occupied time T. After the completion of the data communication n, when the holding time t elapses, the channel is released and supplied to another user.

Figure 6B:
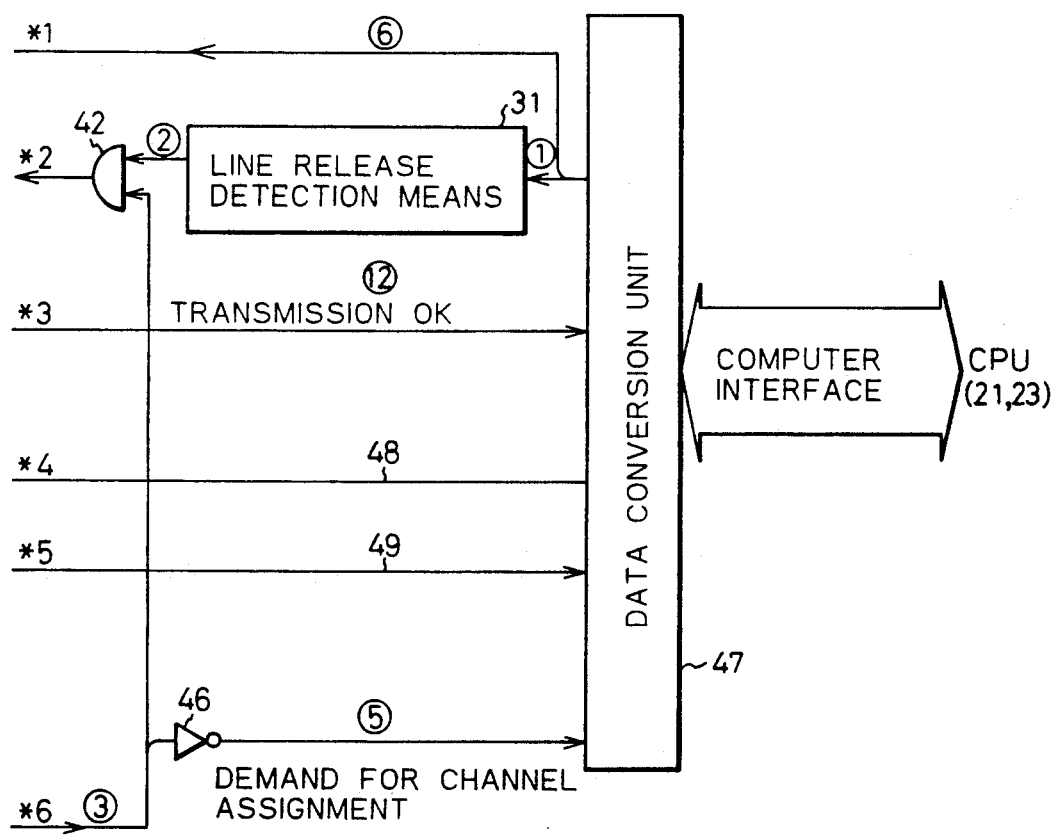

FIGS. 6A and 6B are block diagrams showing the constitution of the system of the present invention. Note that this example is one of common use of equipment for the base station 11 and the terminal stations 12 so as to reduce costs. In the figure, when the switching means SW at the top left is pressed, it is only necessary to connect to the base station mode side at the base station and connect to the terminal station mode side at the terminal stations. In other words, the communication end signal transmission means 32 and the communication end signal reception means 33 are both formed between the MCA radio units (22, 23) and a data conversion unit 47 and form a common control unit for the base station and each of the terminal stations.

The control unit further has the aforesaid switching means SW, which switching means SW selectively switches to either a base station mode or terminal station mode. In the base station mode, it activates the communication end signal transmission means 32 and in the terminal station mode activates the communication end signal reception means 33.

In the base station mode, a timer means 50 detects that a certain occupied time T has not elapsed from the performance of a channel assignment by a certain one terminal station and that a certain holding time t (T>t) has not elapsed from the time when the last of any terminal station completes its radio data communication, then outputs a timer OK signal and during the term of the timer OK signal activates the communication end signal transmission means 32.

On the other hand, in the terminal station mode, the timer means 50 detects that a certain occupied time T has not elapsed from the performance of a channel assignment by a certain one terminal station and that a certain holding time t (T>t) has not elapsed from the time when the last of any terminal station completes its radio data communication, then outputs a timer OK signal and during the term of the timer OK signal activates the data transmission start means 34.

When operating in the base station mode, if the data reception from the terminal station is completed, the line release is detected by the line release detection means 31 through the data conversion unit 47 (①) in the figure). The results of this detection are notified to the communication end signal transmission means 32 through an AND gate 42 (② in the figure). Note that the data conversion unit 47 performs data speed conversion, data error correction, and other operations.

In the notification of the transmission means 32, first, the two conditions must be satisfied that a channel is currently allocated (within a predetermined time T) and it is within the holding time t. If not satisfied, the output of the AND gate 45 opens the AND gate 42 (③ in the figure). Therefore, the communication end signal is sent through the MCA radio unit 22 to the terminal station 12 (also to the control station 13).

Before explaining the operation of the terminal station upon the receipt of the above communication end signal, an explanation will be made of the general operation of the terminal stations. First, when there is a data transmission demand in a terminal station, since it has not yet received a channel allocation, the output of the AND gate 45 is "0" and the output of the inverter 46 is the logic "1". This "1" shows a demand for channel assignment (⑤ in the figure). A call is made from the data conversion unit 47 (⑥ in the figure), this is detected by the data transmission demand detection means 41, and the transmission is started by the radio transmission and reception unit (MCA radio unit 24). Note that the functions ⑤, ⑥, and ⑦ correspond to the functions of the channel assignment means 25 in FIG. 4.

In response to the start of the transmission, a channel allocation is received from the control station (13) (⑧ in the figure). This is received by the channel allocation detection means 43 and a designation of which of the channels CH1, CH2, . . . CHm to use is received. This designation is notified to one of the inputs of the AND gate 45 (⑨ in the figure). When the above channel allocation is received, at the same time the holding time t is set by a communication time limit timer 44 (⑩ in the figure) and the set time is notified to the other input of the AND-gate 45 (⑬ in the figure). If the above channel designation is determined, that channel is used to start the data communication (transmission data line 48 in the figure) and data communication permission is notified to the terminal computer 23. Note that this notification may be replaced with inversion of "1" to "0" by the inverter 46.

Now, when the data communication is completed, as mentioned above, the terminal station 11 sends out a communication end signal. At this time, another terminal station 12 issuing a data transmission demand receives this communication end signal ( ⑪ in the figure). If the communication end signal reception means 33 in the terminal station 12 receives this communication end signal, it notifies the data conversion unit 47 of transmission performance ( ⑫ in the figure). At this time, if the above-mentioned two conditions are met and the output of the AND gate 45 is "1", the logic of the channel assignment demand (⑤ in the figure) is kept held at "0" by the inverter 46, so there is no channel assignment operation and the functions of ⑥ and ⑦ in the figure are directly executed. These functions correspond to the function of the data transmission start means 34 in FIG. 4. Therefore, the terminal station sending out the data transmission demand second can start data communication immediately after the terminal station which completes the data transmission first.

FIG. 7 is a block diagram showing an example of the constitution of the system in the case of use of a microprocessor. In the figure, the MCA radio unit (22, 24) at the left and the CPU (21, 22) at the right are the same as the MCA radio unit and the CPU shown in FIGS. 6A and 6B. The control unit (including data conversion unit 47) formed between the MCA radio unit and CPU in FIGS. 6A and 6B can also be realized by hardware, but this would end up enlarging the apparatus. Therefore, it is desirable to realize it by software. The software is realized by a microprocessor (MPU) 51. The MPU 51 has connected to it a driver/receiver (DRV/RCV) 52 on the MCA radio unit side. The data communication between these is performed through a serial receiving unit 53 and serial transmitting unit 54. Further, the MPU 51 has connected to it a driver/receiver (DRV/RCV) 55 on the CPU side. The data communication between these is performed through a serial receiving unit 56 and serial transmitting unit 57. Note that the computer interface used for connection with the CPU's 21 and 23 is for example an RS-232C. Further, for the data communication between the MPU 51 and the driver/receiver 52, use is made of a radio line frame format and, for the data communication between the MPU 51 and driver/receiver 55, use is made of the data line frame format.

Figure 8:
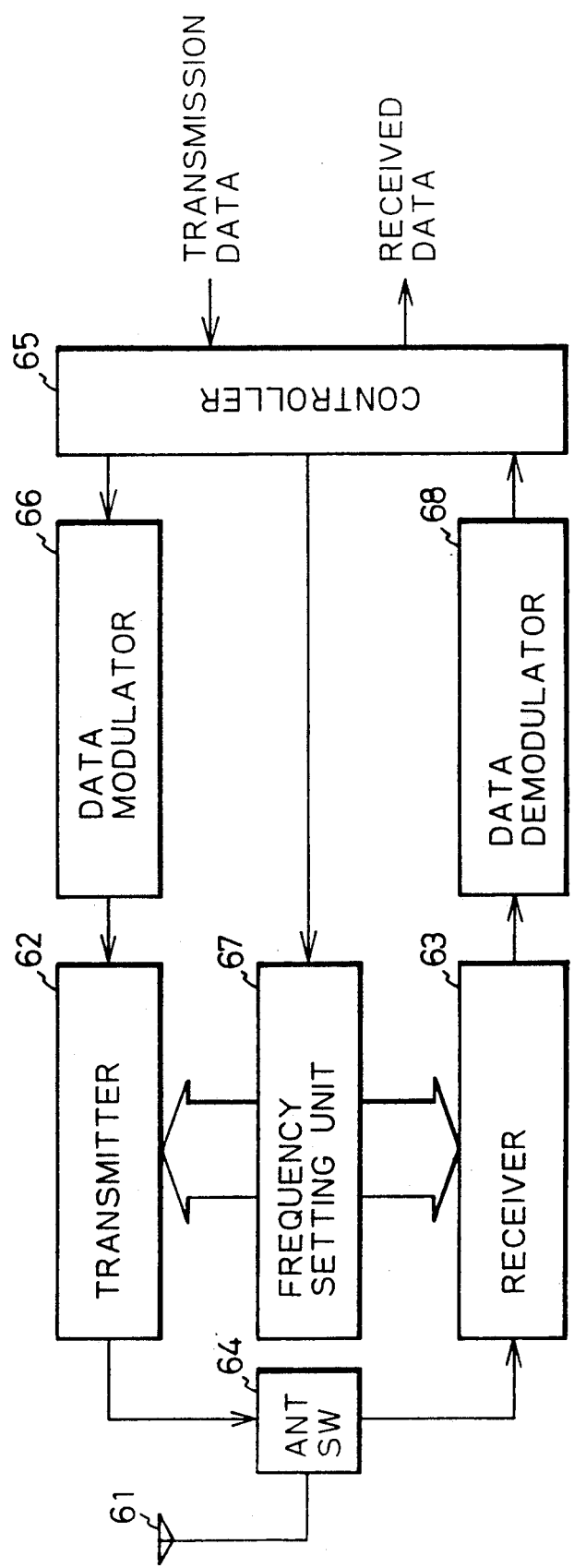
FIG. 8 is a block diagram showing an example of the constitution of a general MCA radio unit.

FIG. 8 is a block diagram showing an example of the constitution of a general MCA radio unit. Specifically, it is a detailed example of the MCA radio units 22 and 24 shown in FIG. 2, FIG. 4, FIG. 6A, and FIG. 7 and is itself known. The transmission data is broadcast by a transmitter 62 from an antenna 61 through an antenna switch (ANT.SW) 64. The received data is received by a receiver 63 from the antenna 61 through the antenna switch 64. In general use is made of different frequencies for the transmitting wave and receiving wave, so a frequency setting unit is provided. The frequency is set by a controller 65. When transmitting, a data modulator 66 is controlled, which is also performed by the controller 65. When receiving, a data demodulator 68 is controlled, which is also performed by the controller 65.

As explained above, according to the present invention, it is possible to successively and consecutively transfer a channel to a plurality of terminal stations demanding data transmission within an allowed occupied term and thus it is possible to suppress the occurrence of call loss during channel allocation.

I claim:

1. A multichannel access radio data communication system having a control station which allocates a channel among a plurality of channels for radio data communication by receiving a communication end signal E and transferring it to one of a plurality of terminal stations, said system comprising:

a base station including communication end signal transmission means for sending out the communication end signal E to the control station promptly after completion of a first radio data communication on a particular channel;

a first terminal station for performing the first radio data communication with said base station on the particular channel; and a second terminal station including communication end signal reception means for receiving the communication end signal E from the control station and for starting a second radio data communication with said base station on the same particular channel when the communication end signal E is received.

2. A system according to claim 1, wherein said base station further comprises a host computer including line release detection means for detecting completion of each of the first and second radio data communications with the first and second terminal stations, respectively, and for outputting a line release signal when the completion of each of the first and second radio data communications is detected; and wherein the communication end signal transmission means sends out the communication end signal E in response to the line release signal.

3. A system according to claim 2, wherein said base station further includes:

timer means for detecting that an occupied time T has not elapsed since a channel assignment prior to the first radio data communication performed by said first terminal station, for detecting that a holding time t has not elapsed since completion of the second radio data communication started by said second terminal station, the occupied time T being greater than the holding time t, for outputting a timer OK signal to said communication end signal transmission means when both the occupied time T and the holding time t are detected as not elapsed and for activating said communication end signal transmission means when the timer OK signal is outputted.

4. A system according to claim 1, wherein said second terminal station includes:

channel assignment means for receiving a channel assignment when said communication end signal reception means fails to detect a communication end signal E upon a demand for start of radio data communication; and data transmission start means for starting a data transmission when the communication end signal reception means detects a communication end signal E upon a demand for start of radio data communication without going through channel assignment.

5. A system according to claim 4, wherein said second terminal station further includes:

timer means for detecting that an occupied time T has not elapsed since a channel assignment prior to the first radio data communication performed by said first terminal station, for detecting that a holding time t has not elapsed since completion of the second radio data communication started by said second terminal station, the occupied time T being greater than the holding time t, for outputting a timer OK signal to said data transmission start means when both the occupied time T and the holding time t are detected as not elapsed and for activating said communication end signal termination means when the timer OK signal is outputted.

6. A method of multichannel access radio data communication in a system comprised of a base station and a plurality of terminal stations between which users perform radio data communication, said method comprising the steps of:

(a) receiving allocation of one of a plurality of predetermined channels and performing channel assignment;

(b) performing a first radio data communication on the predetermined channel in a fixed occupied time T;

(c) holding the predetermined channel for a holding time t after completion of the first radio data communication, the fixed occupied time T being greater than the fixed holding time t;

(d) transmitting a communication end signal from said base station within the holding time t; and (e) successively starting a second radio data communication using the same predetermined channel within the holding time t without performing channel assignment.

7. A multichannel access radio data communication system in which users perform radio data communication, said system performing allocation of one of a plurality of predetermined channels and performing channel assignment, then performing radio data communication in a occupied time T, the predetermined channel being released after the elapse of a holding time t after the completion of the radio data communication, said system comprising:

a base station including:
line release detection means for detecting a line release at the end of a first radio data communication; and
communication end signal transmission means for transmitting a communication end signal E within a holding time t after completion of the first radio data communication when the line release is detected; and at least one terminal station including:
communication end signal reception means for receiving the communication end signal, and
data transmission start means for promptly performing a second radio data communication when the communication end signal is received.

8. A system according to claim 7, wherein said data transmission start means performs the second radio data communication on a channel the same as the first radio data communication when the communication end signal reception means receives the communication end signal E within a holding time t after completion of the first radio data communication.

9. A system according to claim 1, wherein said communication end signal transmission means promptly transmits the communication end signal E within a holding time t after completion of the first radio data communication.

10. A system according to claim 2, wherein said communication end signal transmission means promptly transmits the communication end signal E within a holding time t after completion of the first ratio data communication.

11. A system according to claim 4, wherein said communication end signal transmission means promptly transmits the communication end signal E within a holding time t after completion of the first ratio data communication.

12. A system for a radio data communication, comprising:

line release detection means for detecting the occurrence of a line release from a first radio data communication;

communication end signal transmission means for transmitting a communication end signal E within a holding time t after completion of the first radio data communication when the line release is detected from the first radio data communication;

communication end signal reception means for receiving the communication end signal E within the holding time t after completion of the first radio data communication; and data transmission start means for performing a second radio data communication when the communication end signal is received.

13. A system according to claim 7, wherein said data transmission start means performs the second radio data communication on a channel the same as the first radio data communication when the communication end signal reception means receives the communication end signal E within a holding time t after completion of the first radio data communication.

14. A system according to claim 12, wherein said system is a transceiver and further comprises a multichannel access radio unit, a data conversion unit and a switching unit, wherein said communication end signal transmission means and said communication end signal reception means are both connected between said multichannel access radio unit and said data conversion unit to form a common control unit of said transceiver, said common control unit including said switching means for selectively operating said transceiver in one of a base station mode and a terminal station mode, in the base station mode, activating said communication end signal transmission means and, in the terminal station mode, activating said communication end signal reception means.

* * * * *

UNITED STATES PATENT AND TRADEMARK OFFICE
CERTIFICATE OF CORRECTION

PATENT NO. : 5,159,702  Page 1 of 2
DATED : October 27, 1992
INVENTOR(S) : Aratake It is certified that error appears in the above-identified patent and that said Letters Patent is hereby corrected as shown below:

Col. 1, line 13, after "system" insert --comprised of a base--, delete "wherein the users are" and after "station" insert --and a plurality of terminal stations--;

line 27, after "will" insert --later--;

line 29, before "e.g." insert --(--;

line 30, after "e.g." delete --)--;

line 32, after "station" insert --)--;

line 33, "stations)" should be --station--;

line 34, "stations." should be --stations).-- line 42, after "assignment" insert --,--;

line 55, after "high" insert --,--;

line 58, change ",(assignment" to --(assignment),-;

last line, "litter" should be --little--.

Col. 2, line 4, change "with" to --within--;

UNITED STATES PATENT AND TRADEMARK OFFICE
CERTIFICATE OF CORRECTION

PATENT NO. : 5,159,702
DATED : October 27, 1992
INVENTOR(S) : Aratake

It is certified that error appears in the above-identified patent and that said Letters Patent is hereby corrected as shown below:

line 4, also change "holding time T" to --holding time t--;

line 10, change "holding time T" to --holding time t--;

line 12, change "holding time T" to --holding time t--.

Col. 5,   line 4, change "time T" to --holding time t--;

line 33, after "This" insert --is--.

Signed and Sealed this

Thirtieth Day of November, 1993

BRUCE LEHMAN

Attest:

Attesting Officer      Commissioner of Patents and Trademarks